July 2, 1940.　　　　D. P. MOORE　　　　2,206,748
FRUIT RIND REMOVING MACHINE
Filed Jan. 31, 1939
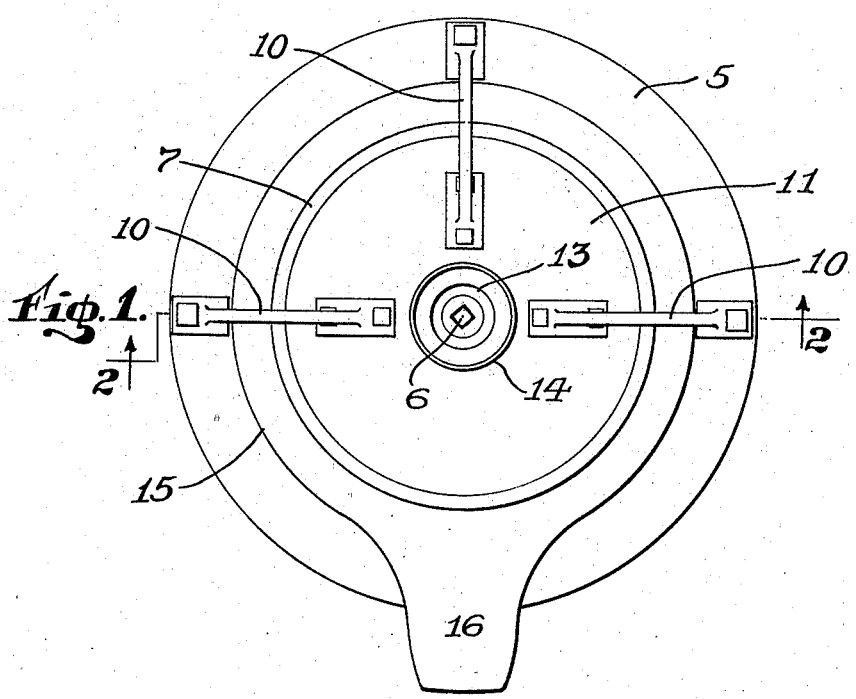
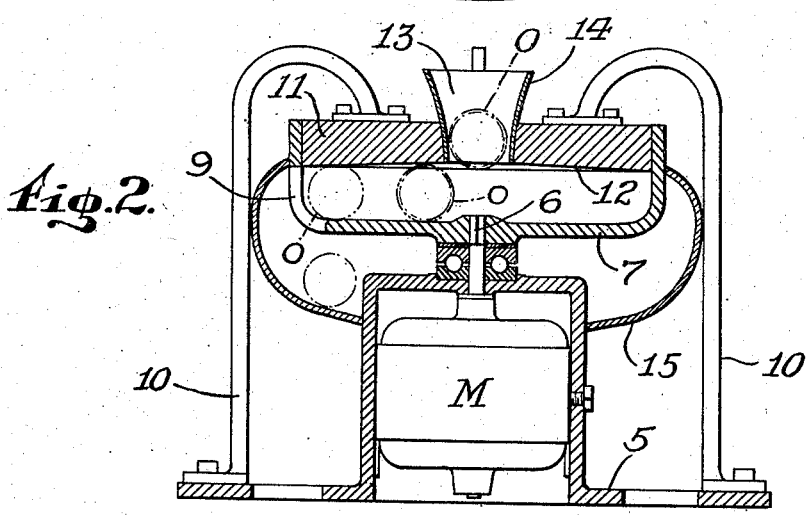
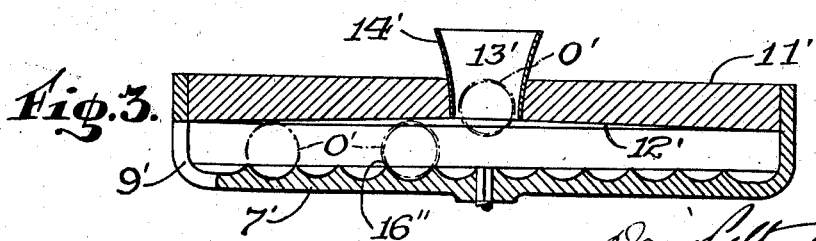
INVENTOR.

Patented July 2, 1940

2,206,748

UNITED STATES PATENT OFFICE 2,206,748

FRUIT RIND REMOVING MACHINE

David Pelton Moore, Avon Park, Fla., assignor to Harrison W. Rogers, Sebring, Fla.

Application January 31, 1939, Serial No. 253,751

1 Claim. (Cl. 146—3)

The present invention relates to improvements in fruit rind removing machines, one object of the invention being the utilization of the old principle of ball machines for removing the outer rinds, or the colored surfaces of oranges and grapefruits.

Many methods and machines have been designed to effectually remove the rinds, and many complicated mechanisms have resulted, but by utilizing the principles of a ball making machine, that is a machine by means of which steel bearing balls are made, any globular fruits, such as oranges and grapefruit can be readily, efficiently and quickly acted upon so that the outer rinds are rasped or ground off and without breaking the juice cells, for as when they are delivered by centrifugal force from the present machine, they are snow white globes, and are then ready to be subjected to cutting up or to have the juice extracted, to be used on the spot or placed in cans.

To clearly illustrate the present invention, attention is invited to the accompanying drawing, in which:

Figure 1 is a top plan view of the complete machine with the fruit delivery hopper removed.

Figure 2 is a cross section on line 2—2 of Figure 1.

Figure 3 is a similar view to Figure 2 of a modified construction.

Referring to the drawing, and more particularly to Figures 1 and 2, thereof, the numeral 5 designates the base, upon which is mounted the drive shaft 6 of the rotary bowl 7. This bowl is provided with an outlet opening 9 at its peripheral edge so that the fruit O may be ejected at such point.

Supports 10 carry the disk top 11, whose underside 12 is roughened as in a rough iron casting, or tooled, or cast with the desired grating, a central opening 13 having a removable directing hopper or spout 14, being provided.

By this arrangement with the bowl being rotated at the desired high speed, the fruit O is delivered through the hopper 14 into the bowl at or near its center. Due to the rotation of the bowl, the fruit is caused to rotate and as the underside of the plate 11 is slightly tapered from its rim toward the center, so that the chamber provided is wider at the center than at the periphery, the fruit is slightly wedged so that the rasping action of the contacting surfaces have a greater tendency to rasp off the rind. In this manner the outer crust of the rind is grated off and the size of the chamber is such that by the time that the fruit has reached the periphery of the chamber, it will enter the outlet 9 and drop into the annular hopper 15, to be delivered through its outlet spout 16 to any desired place.

The outlet spout may be provided with an air suction device to draw the grated rind away from the fruit after it has been expelled by and from the bowl, or it may be separated by screening after the fruit and rind has left the spout 16.

To cause the fruit to be directed in a spiral path, the bowl 7' as illustrated in Figure 3, where similar parts to those previously described have their reference numerals primed, has the spiral grooves 16'', extending from the fruit entrance portion near its center to the outlet 9'.

From the foregoing description taken in conjunction with the drawing, it is evident that such fruits as oranges and grapefruit, or in fact any fruit of a globular shape may be grated so that the exterior rind is removed, and by adjusting the stationary members 11 or 11', by means of shims, various diameter fruit may be used, it being, however, necessary to feed fruit of a graded size to each adjustment of the machine.

As the fruits are acted upon successively, they can be delivered one at a time in succession in this machine, and have a continuous rind removing action.

Where so desired the bottom of the bowl and the underside of the lid or stator both may be roughened, and such roughness may take a roughness similar to emery paper, rough iron casting, or be cast with rasp like surfaces.

When it is employed for use in the canning of fruit juices, it forms the first unit, and the grated fruit is delivered from the outlet of the hopper into a juice extractor or press, and thence on through the complete line of mechanisms to and through the finally produced sealed canned juice.

To increase the capacity of a machine of this type, it is merely necessary to increase its diameter, its area, and have several outlets and a larger inlet for the fruit; or where desired they may be set up in batteries, one to each sized fruit, so that various sized fruits may be peeled at one time and the juice extracted from all sizes.

It is also possible in a machine of this character, and without departing from the spirit of the invention, to provide at the bottom of the rotating member an annular shoulder upon which removably fits a perforated grating bottom, through which the grated rind may sift and thus within the bowl be separated from the fruit. In this instance, a separate outlet at the periphery adjacent the space below the perforated grating bottom directs the grated rind, due to the centrifugal force exerted thereon during rotation of the bowl, through such outlet into a separate auxiliary grated rind hopper, disposed annularly of the bowl adjacent the space below the perforated grating bottom, and within the annular hopper 15. Thus this auxiliary hopper directs the grated rind away from the machine, to any desired point.

By this arrangement the dry unwashed whole graded fruit as it is brought in from the groves may be subjected to this machine, which will remove the external rind in an even and thorough manner and deliver the white whole fruit ready for juicing, comminuting, and/or slicing. In this manner the fruit does not have to be washed and hand handled as is the present practice in preparing citrus fruit for juicing and canning.

What is claimed, is:

A rind removing machine including in combination, a rotatably mounted and a fixedly mounted annular member cooperating to provide a discal chamber having a fruit inlet at its center and a fruit outlet adjacent its periphery, whereby the fruit entering the chamber at the center is acted upon by centrifugal force and caused to have opposite faces of the two members within the chamber and during rotation of the rotatable member act upon the fruit to rasp the exterior rind from the fruit before expulsion through the outlet, and a concentrically disposed fruit receptacle surrounding the rotatable member to receive the fruit at any point as the fruit is ejected by centrifugal force through the outlet of the chamber.

DAVID PELTON MOORE.